Figure 1:
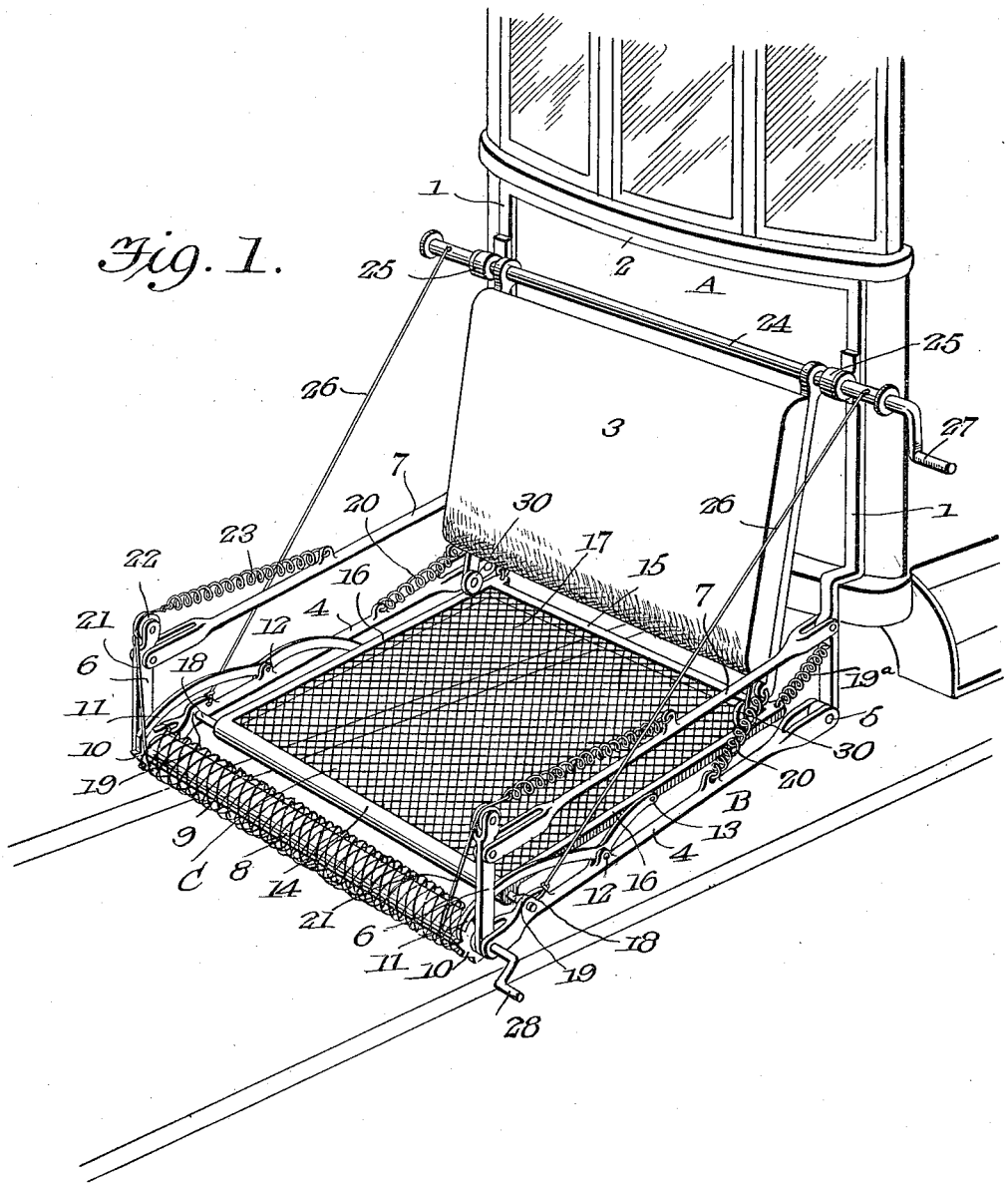

T. C. ROSS.
STREET CAR FENDER.
APPLICATION FILED FEB. 20, 1915.

1,173,389.

Patented Feb. 29, 1916.
2 SHEETS—SHEET 1.

Witnesses
Hugh H. Ott.
R. M. Smith.

Inventor
Thomas Clyde Ross
By Victor J. Evans
Attorney

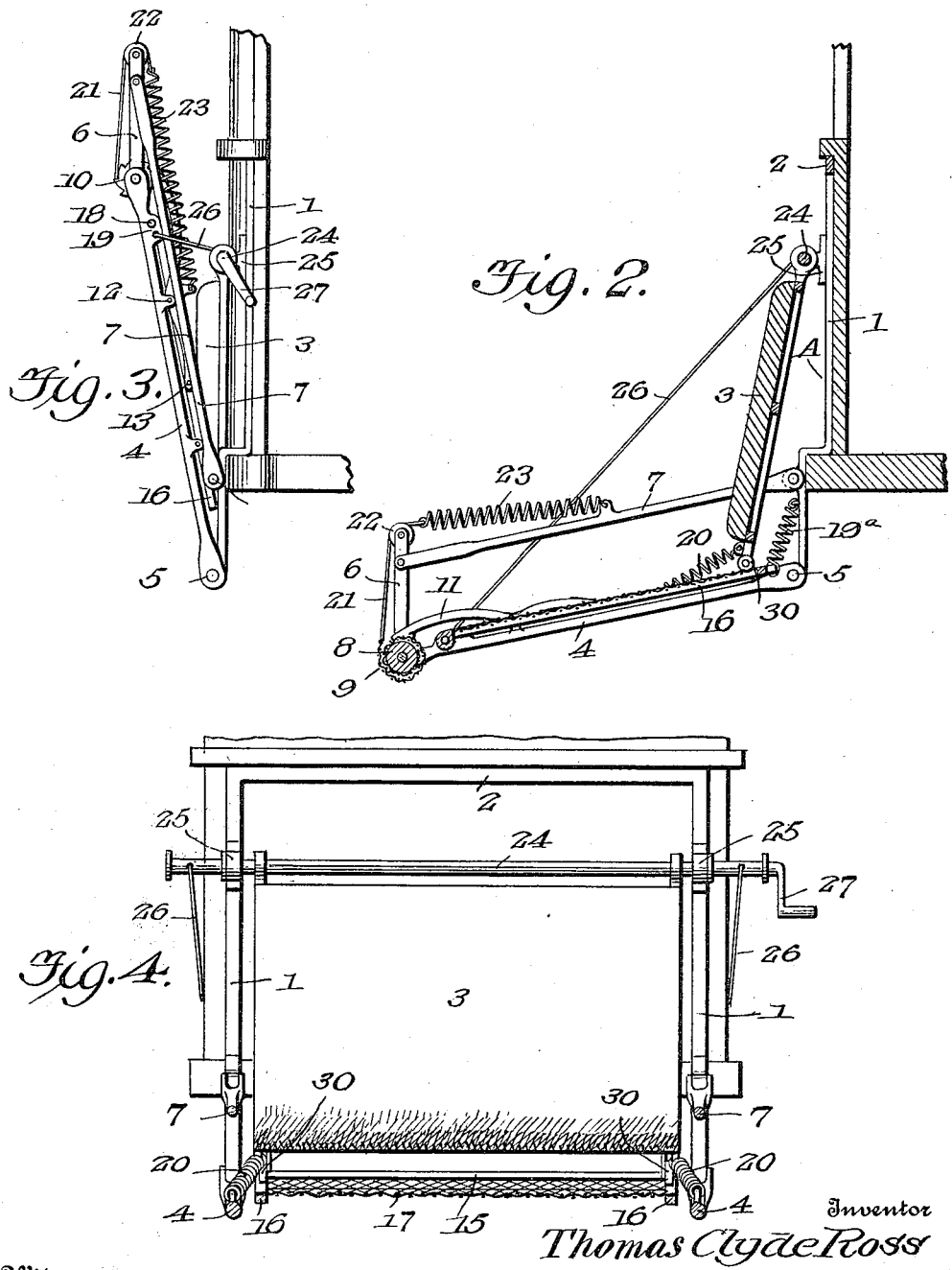

UNITED STATES PATENT OFFICE.

THOMAS CLYDE ROSS, OF CROOKSVILLE, OHIO.

STREET-CAR FENDER.

1,173,389.

Specification of Letters Patent. Patented Feb. 29, 1916.

Application filed February 20, 1915. Serial No. 9,643.

*To all whom it may concern:*

Be it known that I, THOMAS CLYDE ROSS, a citizen of the United States, residing at Crooksville, in the county of Perry and State of Ohio, have invented new and useful Improvements in Street-Car Fenders, of which the following is a specification.

This invention relates to car fenders, the object in view being to provide a safe and satisfactory fender for use either on street or railway cars, whereby a person or object may be picked up with safety and securely retained by the fender until the motorman has had an opportunity to stop the car, the fender embodying a safety net which is automatically released and drawn into such position as to form a flexible fence to prevent the occupant of the fender from being thrown therefrom.

A further object of the invention is to provide a fender of the character referred to which may be readily folded from its catching position to a substantially vertical position in front of the dash of the car.

With the above and other objects in view, the invention consists in the novel construction, combination and arrangement of parts, as herein described, illustrated and claimed.

In the accompanying drawings:—Figure 1 is a perspective view showing the fender of this invention applied to a car. Fig. 2 is a central vertical longitudinal section through the same. Fig. 3 is a side elevation showing the fender folded. Fig. 4 is a vertical cross section taken through the rear portion of the scoop and looking rearwardly.

The fender contemplated in this invention comprises a substantially upright supporting frame designated generally by A and comprising the substantially parallel upright side bars 1 and the connecting top cross bar 2, the said supporting frame being fastened to the car dash as shown and provided with a pad or cushion 3 to prevent injury to persons picked up by the fender while the car is moving rapidly.

B generally designates the scoop, the frame of which embodies the substantially parallel side bars 4 which are connected by pivots or hinge joints 5 to the bottom ends of the side bars 1 of the back frame A as shown. Pivotally connected to the bars 4 adjacent to the forward extremities thereof are posts 6 from which one or more side guard rails 7 extend rearwardly to the bars 1 of the supporting frame, the guard rails 7 being pivotally connected at their forward extremities to the posts 6 and pivotally connected at their rear extremities to the uprights 1 in order to enable the scoop to be folded from a substantially horizontal to a substantially vertical position and vice versa.

Connecting the forward extremities of the side bars 4 is a roller 8 coextensive in length with the front edge of the fender and journaled in bearings in the forward extremities of the bars 4. The roller 8 has wound thereon a flexible safety net 9 and is provided adjacent to its opposite extremities with ratchet wheels 10 adapted to be engaged by pawls or detents 11. Each pawl or detent 11 is pivotally mounted at 12 on one of the side bars 4 of the frame B and has a jointed connection at its rear end, as shown at 13, to one of the side bars of a substantially rectangular stretcher frame designated generally at C and composed of the front and rear bars 14 and 15 respectively and the side bars 16, said stretcher frame being covered with wire netting or fabric indicated at 17. The front bar 14 of the stretcher frame which forms part of the flexible bottom for the scoop, is extended to form journals 18, which are received in bearings or eyes 19 carried by the side bars 4 of the scoop frame. The rear edge of the stretcher frame C is yieldingly supported and sustained by means of coiled springs 19', the lower ends of which are shown as connected to the rear bar 15 of the stretcher frame and the upper extremities of which are connected to the uprights 1 of the back frame. The frame of the cushion 3 is also held forward out of contact with the dash of the car by means of coiled springs 20 the rear ends of which are fastened to the cushion frame and the forward extremities of which are attached to the scoop frame.

The means for unwinding the net from the roller 8 comprises a pair of flexible elements 21 such as ropes which are wound around the end portions of the roller 8 and which extend therefrom upwardly over guide pulleys 22, and are fastened to the forward extremities of tensioning members, such as coiled springs 23 the opposite or rear extremities of which are shown for convenience as fastened to the top side guard rails 7.

24 designates a winding shaft journaled in bearings 25 on the uprights 1 and having attached thereto flexible members 26 such as ropes, the forward extremities of which are connected to the front part of the scoop frame. By means of a crank handle 27 at one end of the shaft 24, the scoop frame may be raised and lowered.

28 designates a detachable crank handle for rewinding the saftey net 9 upon the roller 8 and stretching the springs 23.

From the foregoing description, taken in connection with the accompanying drawings, the operation of the fender will now be understood. The fender is shown in its normal or catching position in Fig. 1. When a person or object falls upon the scoop of the fender, the cushion 3 prevents the person from being injured and as the weight of such person or object is imposed upon the stretcher frame C, the rear portion thereof is depressed thereby operating the pawls 11 and causing them to move out of engagement with the ratchet wheels 10. Thereupon, the springs 23 exert their tension and pull upon the flexible members 21, the latter operating to unwind the safety net 9 from the roller 8 and draw the same upwardly over the guide pulleys 22. The safety net thus prevents the person or object from being tossed out of the fender after being caught therein. Whenever desirable, the operator by turning the hand crank 27 may wind up the hoisting ropes 26 and move the scoop frame into a substantially vertical position parallel to the back frame A. The net 9 is again rewound on the roller 8, in the manner above explained, by applying the detachable hand crank 28 to the end of the roller 8 and turning the same in a direction to stretch the springs 23.

30 designates rollers carried by the opposite lower corners of the cushion frame 3 which move in contact with the side bars of the stretcher frame and act to hold the latter down for the purpose of insuring the disengagement of the pawls 11 from the ratchet wheels 10 in order to release the safety net.

What I claim is:—

1. In a car fender, the combination of a scoop, upright posts at the forward corners of said scoop, means for supporting said scoop in catching position, a roller extending along the forward edge of the scoop and substantially coextensive in length therewith, a flexible safety net wound upon said roller, and means tripped by impact of an object against the scoop operating to draw said net upwardly toward the tops of said posts so as to assume a substantially vertical position.

2. In a car fender, the combination of a scoop, upright posts at the forward corners of said scoop, means for supporting said scoop in catching position, a roller extending along the forward edge of the scoop and substantially coextensive in length therewith, a flexible safety net wound upon said roller, means tripped by impact of an object against the scoop operating to draw said net upwardly toward the tops of said posts so as to assume a substantially vertical position, said means embodying spring tensioned flexible members attached to said net and guided over the tops of said posts, and pawl and ratchet elements for holding said roller from turning until it is tripped.

3. In a car fender, the combination of a scoop, upright posts at the forward corners of said scoop, means for supporting said scoop in catching position, a roller extending along the forward edge of the scoop and substantially coextensive in length therewith, a flexible safety net wound upon said roller, means tripped by impact of an object against the scoop operating to draw said net upwardly toward the tops of said posts so as to assume a substantially vertical position, said means embodying spring tensioned flexible members attached to said net and guided over the tops of said posts, and pawl and ratchet elements for holding said roller from turning until it is tripped, said pawl being pivotally mounted on the fender frame and actuated by the depression of the scoop with which it is connected.

4. In a car fender, the combination with upright supporting means of a scoop embodying side bars hinged to said supporting means, upright posts pivotally connected to and extending upwardly from the forward extremities of said side bars, guard rails substantially parallel to said side bars and pivotally connected to said supporting means and said posts, a winding shaft supported by said back frame, flexible elements extending from the scoop frame to said winding shaft, a roller extending along the forward edge of the scoop and substantially coextensive in length therewith, a flexible safety net wound upon said roller, and means tripped by impact of an object against the scoop operating to draw said net upwardly toward the tops of said posts so as to assume a substantially vertical position.

In testimony whereof I affix my signature in presence of two witnesses.

THOMAS CLYDE ROSS.

Witnesses:
W. C. LUSTER,
HARRY ROSS.